United States Patent
Jacob et al.

(10) Patent No.: US 9,326,590 B2
(45) Date of Patent: May 3, 2016

(54) MOLD FOR AN INJECTION MOLDED APPLICATOR HEAD

(71) Applicants: Christophe Jacob, Franqueville-Saint-Pierre (FR); Herve Bouix, New York, NY (US)

(72) Inventors: Christophe Jacob, Franqueville-Saint-Pierre (FR); Herve Bouix, New York, NY (US)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 14/464,047

(22) Filed: Aug. 20, 2014

(65) Prior Publication Data

US 2015/0024080 A1    Jan. 22, 2015

Related U.S. Application Data (62) Division of application No. 13/946,046, filed on Jul. 19, 2013.

(51) Int. Cl.
| | |
|---|---|
| *B29C 45/44* | (2006.01) |
| *A46B 9/02* | (2006.01) |
| *A46B 3/00* | (2006.01) |
| *B29C 45/26* | (2006.01) |
| *A45D 40/26* | (2006.01) |
| *A46D 1/00* | (2006.01) |
| *B29C 45/40* | (2006.01) |
| *B29K 101/12* | (2006.01) |
| *B29L 31/42* | (2006.01) |
| *B29L 31/00* | (2006.01) |

(52) U.S. Cl.
CPC .............. *A46B 9/021* (2013.01); *A45D 40/262* (2013.01); *A46B 3/005* (2013.01); *A46D 1/0253* (2013.01); *A46D 1/0261* (2013.01); *B29C 45/2626* (2013.01); *A46B 2200/1053* (2013.01); *B29C 45/4005* (2013.01); *B29K 2101/12* (2013.01); *B29L 2031/42* (2013.01); *B29L 2031/718* (2013.01)

(58) Field of Classification Search
CPC ..................... B29C 45/4005; B29C 45/2626
USPC .................................................. 425/805, 557
See application file for complete search history.

(56) References Cited

U.S. PATENT DOCUMENTS

| | | | | |
|---|---|---|---|---|
| 4,422,986 | A | * | 12/1983 | Cole ............................. 425/805 |
| 5,926,900 | A | | 7/1999 | Bennett |
| 6,347,934 | B1 | * | 2/2002 | Andersen et al. ............. 425/557 |
| 7,503,093 | B2 | | 3/2009 | Weihrauch |
| 7,632,489 | B2 | | 12/2009 | Wyatt et al. |
| 7,762,269 | B2 | | 7/2010 | Wyatt et al. |
| 7,992,577 | B2 | | 8/2011 | De Brouwer et al. |
| 8,066,015 | B2 | | 11/2011 | Wyatt et al. |
| 8,336,560 | B2 | | 12/2012 | Dumler et al. |
| 2006/0070635 | A1 | | 4/2006 | Dumler et al. |

(Continued)

OTHER PUBLICATIONS

Related U.S. Appl. No. 29/400,848, filed Sep. 1, 2011.

(Continued)

*Primary Examiner* — Tim Heitbrink
(74) *Attorney, Agent, or Firm* — Peter Giancana (57) ABSTRACT

A molded cosmetic applicator head having a core that supports an array of semi-conical bristles arranged in rows and columns, such that the surfaces of the bristles assume certain orientations, and wherein at least some of the bristles have at one or more prominent depressions and/or prominent protrusions located on a curved surface. A mold for an injection molded applicator head is also described.

8 Claims, 13 Drawing Sheets

(56) References Cited

U.S. PATENT DOCUMENTS

| | | |
|---|---|---|
| 2007/0062552 A1 | 3/2007 | DeBrouwer et al. |
| 2012/0060859 A1 | 3/2012 | Wyatt et al. |
| 2012/0170965 A1 | 7/2012 | Kulik et al. |
| 2012/0192892 A1 | 8/2012 | Kulik |

OTHER PUBLICATIONS

Related U.S. Appl. No. 29/400,858, filed Sep. 1, 2011.
Related U.S. Appl. No. 29/440,795, filed Dec. 27, 2012.
Related U.S. Appl. No. 29/440,800, filed Dec. 27, 2012.

* cited by examiner

MOLD FOR AN INJECTION MOLDED APPLICATOR HEAD

FIELD OF THE INVENTION

The invention is in the field of molded cosmetic applicators, especially for delivering a high volume of product to the eyelashes, and for grooming the eyelashes and eyebrows.

BACKGROUND

Mascara brushes having a molded rod (core) and/or bristles are known. The rod and bristles may be integrally molded simultaneously, in one molding cycle, or parts of the applicator may be formed in successive molding cycles. Being able to form a complete applicator in one molding cycle is a significant advantage in time and cost.

It is common for the molded bristles or tines to taper down toward the free end of the bristle. One example of this is a conical bristle, although other tapered shapes have been used (see for example US2006-0070635). Molded bristles in various other shapes are also known (i.e. U.S. Pat. Nos. 7,503,093; 7,992,577; 8,336,560; US2012-0170965; US2012-0192892). It is also known to form the bristles with one or more depressions, protrusions or other features that are, in some way, intended to affect the performance of the brush (i.e. U.S. Pat. No. 7,503,093 especially FIGS. 30 and 52).

None of the foregoing discloses a molded cosmetic applicator having semi-conical bristles with at least two depressions and/or protrusions located only on the curved surface of the semi-cone, wherein the bristles and applicator core are integrally molded in one molding cycle.

OBJECTS OF THE INVENTION

A main object of the invention is to provide a molded cosmetic applicator having semi-conical bristles with at least two depressions and/or protrusions located only on the curved surface of the semi-cone.

Another main object of the invention is to provide a method of making the foregoing applicator wherein the bristles and applicator core are integrally molded in one molding cycle.

SUMMARY

We disclose a molded cosmetic applicator head having a core that supports an array of semi-conical bristles arranged in rows and columns, such that the surfaces of the bristles assume certain orientations, and wherein at least some of the bristles have at one or more depressions and/or protrusions located on a curved surface. The bristles and applicator core are integrally molded in one injection molding cycle. Protrusions along the height of the bristles provide improved separation of hairs and better definition. Depressions along the height of the bristles act as reservoirs of product, so that the present invention delivers more product than a conventional applicator head. This applicator head can be used for eyelash makeup and treatment products, as well as eyebrow makeup and treatment products.

DEFINITIONS

Throughout the specification, the word "comprise" (or its conjugates) means that a collection of objects is not necessarily limited to those objects explicitly recited.

By "cone" we mean a right circular cone.

Strictly speaking, the terms "semi-cone" and "semi-conical" include a cone whose base is a semi-circle (i.e. the arc of the base measures 180°). For convenience, however, "semi-cone" and "semi-conical" will also include a cone whose base is a circular segment having an arc of about 160° to no more than 180°.

Throughout the specification, the "proximal end" of the applicator head is the end nearer to a handle, as described below. The "distal end" of the applicator head is the end farther from the handle.

DETAILED DESCRIPTION

Mascara applicators typically comprise a handle, a rod or core extending from the handle, and an array of bristles projecting from the core. The present invention contemplates specific bristle shapes integrally molded with the core, in one molding cycle. The molded core and bristles may be referred to as the applicator head. The handle may also be integrally molded with the applicator head, or the applicator head may be attached to a handle at a later time.

The Mold

FIGS. 1-4 depict molds according to the present invention that are suitable for forming bristles according to the present invention. Such a mold (2) comprises a number of separable mold sections (2a). When assembled, the mold sections define a mold cavity (1), into which plastic or elastomeric material will be injected. The mold cavity comprises a core space (1a) and a number of bristle spaces (1b). The core space has a longitudinal axis that extends along the length of the core space. The number of bristle spaces is equal to the number of bristles (10b) in a finished applicator head (10) that is formed from the mold.

Mold Sections

A mold (2) according to the present invention, comprises a number of mold sections (2a), that when assembled, form the mold cavity (1). Each mold section has a sculpted lateral face (2b) and a flat lateral face (2c). The sculpted lateral face is flat except for bristle spaces (1b) cut into it. Each bristle space opens up onto the sculpted lateral face. In contrast, the flat lateral face is continuously flat, and has no bristle spaces therein.

Generally, one or more sections (2a) of the mold (2) may differ from one or more other sections of the mold. However, in the more preferred embodiments of the invention, the multiple sections of the mold are substantially identical, so that a molded applicator head has cylindrical symmetry along its length. Preferably, each mold section (2a) is shaped as a truncated solid circular sector (as in FIGS. 1-4), characterized by a sculpted lateral face (2b), a flat lateral face (2c), and an interior face (2d).

The sculpted lateral face (2b) and flat lateral face (2c) have a relative orientation defined by a central angle, $\gamma$. For example, in FIGS. 1-4, we show eight identical sections in a mold, so each mold section fills an angle of $360°/8=45°$. More generally, we define M as the number of mold sections. When each mold section is the same size, the central angle, $\gamma$, of each mold section is $360°/M$. For example, when there are six sections in the mold, each mold section fills an angle of $60°$. For a ten section mold, that would be $36°$, for a twelve section mold, $30°$, etc.

Figure 4:
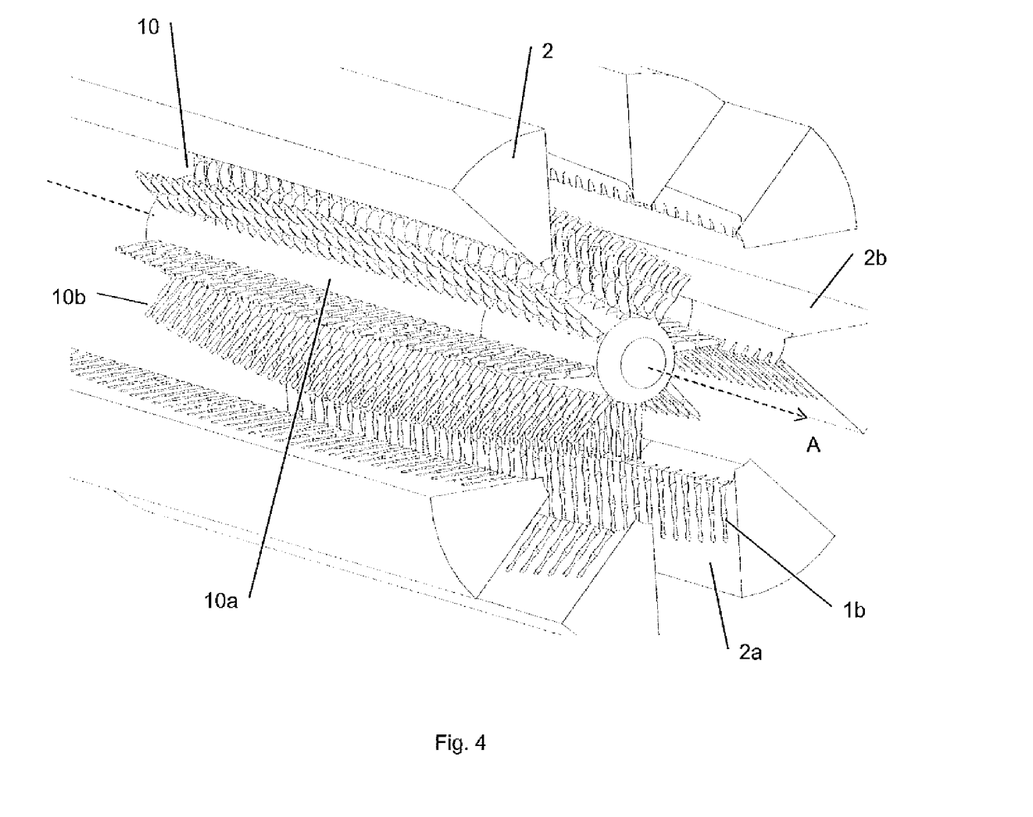
FIG. 4 is a perspective view of an eight section mold and molded applicator head therein. One section of the eight section mold is not shown for clarity.

In an assembled mold, the interior faces (2d) define the core space (1a) and the shape of the core (10a) of the molded article. (Note: In FIG. 4, axis A represents both the longitudinal axis of the core space and the longitudinal axis of a molded applicator head.) In some preferred embodiments, the interior faces are curved, such that the core of the molded article will have a circular cross section. Preferably, the interior faces define a core that is approximately cylindrical. Alternatively, if the interior faces are straight, then the core would have a polygonal cross section. Optionally, the interior faces may define a core that has wider and narrower portions. In this case, the width ($\delta$, see FIG. 1) of one or more mold sections varies along the length of the mold section. For example, in the figures, the core of the applicator head is wider in the middle (i.e. the mold sections are narrower in the middle, see FIG. 5, for example) and tapers toward either end (i.e. the mold sections are wider at the ends).

The more sections (2a) in a mold, the more flexibility there is in designing cosmetic applicators of the present invention. However, increasing the number of mold sections makes the mold more difficult to operate in a commercial manufacturing environment. Therefore, in preferred embodiments, M=2-12. Molds with 5, 6, 10 or 11 sections (i.e. $\gamma=72°$, $60°$, $36°$ or $32.72°$, respectively) are more preferred. Molds with 7 sections ($\gamma=51.43°$) or 9 sections ($\gamma=40°$) are still more preferred, and exactly 8 sections ($\gamma=45°$) is most preferred. Of course, when there are relatively fewer columns of bristles (i.e. 4, 3 or 2; $\gamma=90°$, $120°$, $180°$), then the applicator performs more like a comb and less like a brush, but this is still within the scope of the present invention.

Bristle Spaces

In preferred embodiments, bristle spaces (1b) are regularly arranged in columns that extend down the core space (1a), parallel to the longitudinal axis of the core space. In an assembled mold, a column of bristle spaces is defined by adjacent mold sections (2a) that contact each other. The number of columns in a mold equals the number of mold sections, M. This is because each mold section has one column of bristle spaces cut into its sculpted lateral face (2b, see FIG. 5). The number of bristle spaces in a column along the length of the core space will typically range from 5 to 50, preferably from 10 to 40, more preferably from 20 to 35 bristle spaces. For example, the mold (2) of FIG. 4 has eight columns with 35 bristle spaces in each column, extending down the core space, parallel to the longitudinal axis of the core space.

In preferred embodiments, bristle spaces (1b) are regularly arranged in rows, each row lying on a circumference of the core space (1a), in a plane that is perpendicular to the longitudinal axis of the core space. It may be appreciated that the maximum number of bristle spaces in a row is equal the number of mold sections, M. This is because each mold section may contribute only one bristle space or no bristle spaces to each row. In some preferred embodiments, all rows have M bristle spaces that are evenly spaced around a circumference of the core space.

In the most preferred embodiments, bristle spaces are regularly arranged in columns and rows. The bristle spaces of the mold typically extend radially from the core space, so that in a molded applicator head, the bristles (10b) extend radially from the core (10a) of the applicator head. In terms of releasing the finished part from the mold without damaging the bristles, A row and column arrangement of radial bristle spaces is most preferred, but may not be absolutely necessary in every embodiment.

As noted above, each mold section has a sculpted lateral face (2b) and a flat lateral face (2c). In the assembled mold, a bristle space is defined by the sculpted lateral face of one mold section contacting the flat lateral face of an adjacent mold section. Thus, every bristle space in the mold has at least one flat face (1c) that extends the length of the bristle space. This flat face is free of features, such as prominent protrusions and prominent depressions, and is a characterizing feature of the bristle spaces of a mold according to the present invention.

The other sides of the bristle spaces (1b) may comprise flat and/or rounded portions, and the horizontal cross section of the bristle space could be any conceivable shape, only limited by the ability to machine the mold section. Preferred, however, is a bristle space having a horizontal cross section that is shaped as a circular segment that has an arc that ranges from about $160°$ to no more than $180°$, and whose radius decreases as you move from base to tip. Such a bristle space would have a semi-conical profile comprised of a flat face (1c) and a curved face (1d). Preferably, the bristle space would have a rounded tip (1e, see FIG. 5, for example). The remainder of each bristle space may be shaped to have one or more depressions, one or more protrusions, or both on the curved face of the semi-conical bristle space, while the flat face has no such features. Preferably, each semi-conical bristle space has at least two depressions and/or protrusions located on its curved surface. These depressions and or protrusions are deliberately machined into the bristle space, and do not arise as a result of random, macroscopic or microscopic surface irregularities.

The Applicator Head

An applicator head (10) comprises core (10a) and an array of bristles (10b) projecting from the core. The present invention contemplates specific bristle shapes integrally molded with the core, in one molding cycle.

The Core

The core (10a) of the applicator head is integrally molded with the bristles (10b). The core may be of solid material or it may have a hollowed interior portion. A hollowed interior portion would require an additional die in the molding operation. Preferably, the core has a circular cross section. In some embodiments, the core is approximately cylindrical. Alternatively, the core may have wider and narrower portions. For example, in the figures, the core is wider in the middle and tapers toward either end.

Figure 14A:
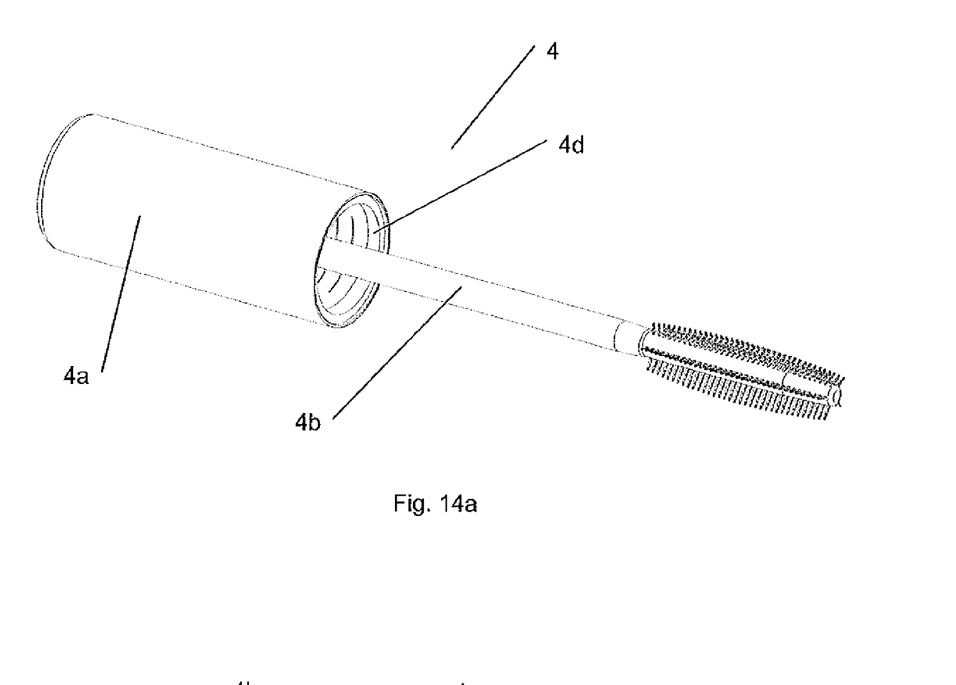
FIGS. 14*a-b* show an applicator head (10) with 5 columns of bristles symmetrically arranged, and its assembly to a handle.

In some embodiments (see FIGS. 14a and 14b, for example), a stem portion (10f) which is free of any bristles (10b) may depend from the proximal end (10g) of the core (10a) of the applicator head (10). The stem portion may have a diameter that is reduced compared to the diameter of the core. The reduced diameter is designed to facilitate the attachment of a handle. For example, a typical handle (4) may comprise a closure (4a) that is able to attach to a reservoir of product. The handle may also comprises a rod (4b). The stem of the applicator head (10) may be retained in a hollow portion (4c) of the rod. Alternatively, the core (10a) of the applicator head (10) may have a hollowed portion that opens onto the proximal end (10g) of the core. This hollowed portion may be designed to receive and retain the rod (4b) of a handle (4). In general, the handle is of a type that is suitable for manipulating an eyelash or eyebrow cosmetic applicator, as known in the art. A typical handle may have a threaded engagement (4d) for attaching to a reservoir of product.

Bristles

Each bristle space (1b) in the mold (2) will give rise to one bristle (10b) in a molded applicator head (10). Thus, the number of bristles in a finished applicator head is equal to the number of bristles spaces in the mold. As noted above, every bristle space (1b) in the mold has a flat face (1c) that extends the length of the bristle space. Consequently, every bristle in a molded applicator head will have a flat surface (10c) that extends the full height, H, of the bristle, and that is free of surface features such as protrusions and depressions (see FIG. 3). This is a characterizing feature of the bristles of the present invention.

A bristle molded in a bristle space according to the preferred embodiment described above, is semi-conical, comprising a flat surface (10c), a curved surface (10d), and a rounded tip (10e). Each bristle would also have one or more prominent surface features on its curved surface. Prominent surface features may include depressions, protrusions, or any combination thereof. A prominent depression on the curved face (1d) of the bristle space (1b) gives rise to a prominent protrusion on the curved surface (10d) of the bristle. Likewise, a prominent protrusion on the curved face of the bristle space gives rise to a prominent depression on the curved surface of the bristle. Preferably, each semi-conical bristle has at least two prominent depressions and/or prominent protrusions located on its curved surface. More preferably, in an applicator head, at least some of the bristles have from 4 to 8 prominent depressions and/or prominent protrusions. Even more preferably, in an applicator head, at least some of the bristles have from 9 to 12 prominent depressions and/or prominent protrusions.

Figure 6A:
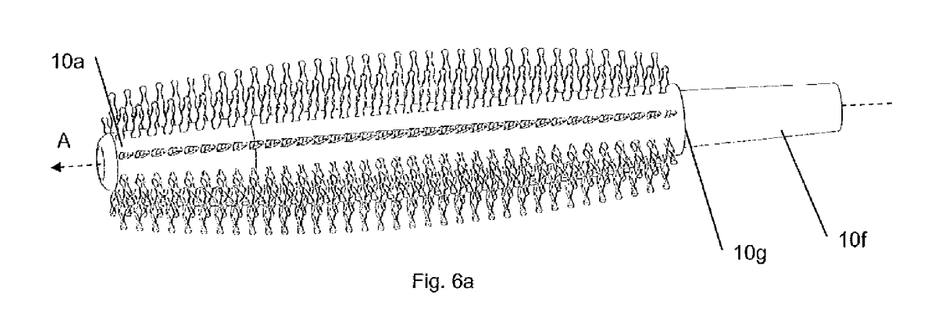
FIG. 6*a* is a perspective view of one embodiment of an applicator head having semi-conical bristles comprising multiple depressions on the rounded surface and no surface features on the flat surface.
Figures 6B, 6C:
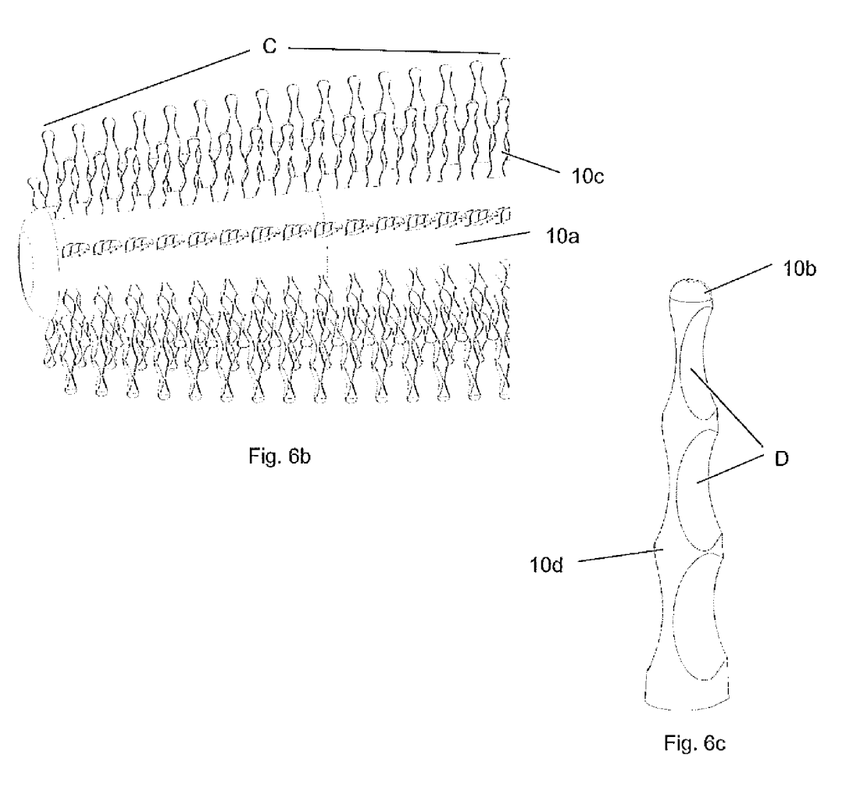
FIG. 6*b* is a close up of a portion thereof.
FIG. 6*c* shows one of the bristles.

In contrast, the flat surface (10c) of the bristle (10b) has no prominent depressions or prominent protrusions. Referring to FIGS. 6a and 6b, in a column, C, of bristles, all of the flat surfaces lie in the same plane and are parallel to the longitudinal axis, A, of the applicator head. In a row of bristles, the flat surfaces of adjacent bristles are oriented to each other at an angle, $\gamma=360°/M$ (45° in FIG. 4, for example). These orientations are a characterizing feature of the invention, and are important. For example, in a cosmetic applicator according to the present invention, as the bristles are drawn through the hair, the hair has a lot of contact with the curved surfaces of the bristles, and with the depressions and/or protrusions, thereon. In contrast, the hair has relatively little contact with the flat surfaces of the bristles. When the present invention is implemented as a mascara brush, the depressions in the bristles tend to be more useful for depositing a lot of product on the eyelashes, while the protrusions in the bristles tend be more useful for separating and grooming the eyelashes. Furthermore, this orientation of the flat and curved surfaces allows the molded applicator head to be ejected from the mold easily, with no damage.

Within the limits herein described, the semi-conical bristles (10b) in an applicator head (10) may have any size and spacing suitable for its intended functions, e.g., application, arrangement, and/or separation of human hairs, such as eyelashes. Also, all the bristles in a single applicator head may be same or different. For example, all the bristles in a single applicator head may be same height, H, or not. FIG. 4 shows an example where the height of the bristles varies along the length of the core (10a), being taller toward the middle of each column, and shorter toward the ends of each column. Or, for example, within each row, the bristles may be the same height or different.

The prominent protrusions and/or prominent depressions of the bristles may be any suitable size or shape. From one bristle to the next, the sizes and shapes of the protrusions and/or depressions may be the same or different, and they may be located at the same height along each bristle or not. On any given bristle, the protrusions and/or depressions may be symmetrically located or not. In some preferred embodiments, a prominent depression is a concavity below the curved surface (10d) of a bristle that has a depth between 0.1 mm and 1.2 mm, more preferably from about 0.2 mm to about 0.8 mm, and most preferably from about 0.3 mm to about 0.6 mm; and a width (i.e. largest lateral dimension) of 0.01 mm to 0.15 mm, more preferably from about 0.05 mm to about 0.12 mm, and most preferably from about 0.08 mm to about 0.10 mm. In some preferred embodiments, a prominent protrusion is a convexity above the curved surface of a bristle that has a height between 0.1 mm and 1.2 mm, more preferably from about 0.2 mm to about 0.8 mm, and most preferably from about 0.3 mm to about 0.6 mm; and a width (i.e. largest lateral dimension) of 0.01 mm to 0.3 mm, more preferably from about 0.05 mm to about 0.15 mm, and most preferably from about 0.08 mm to about 0.7 mm. Thus, a "prominent depression" or "prominent protrusion" includes intentional surface features that result from machining the bristle space (1b), but does not include random, microscopic irregularities in the surface of the bristle material.

Several embodiments of bristle types according to the present invention are shown in the figures. These will be described in comparison to a semi-conical bristle that has no prominent surface features. Throughout the drawings, prominent depressions will be denoted by D, and prominent protrusions by P.

Bristles with Prominent Depressions

Figure 1:
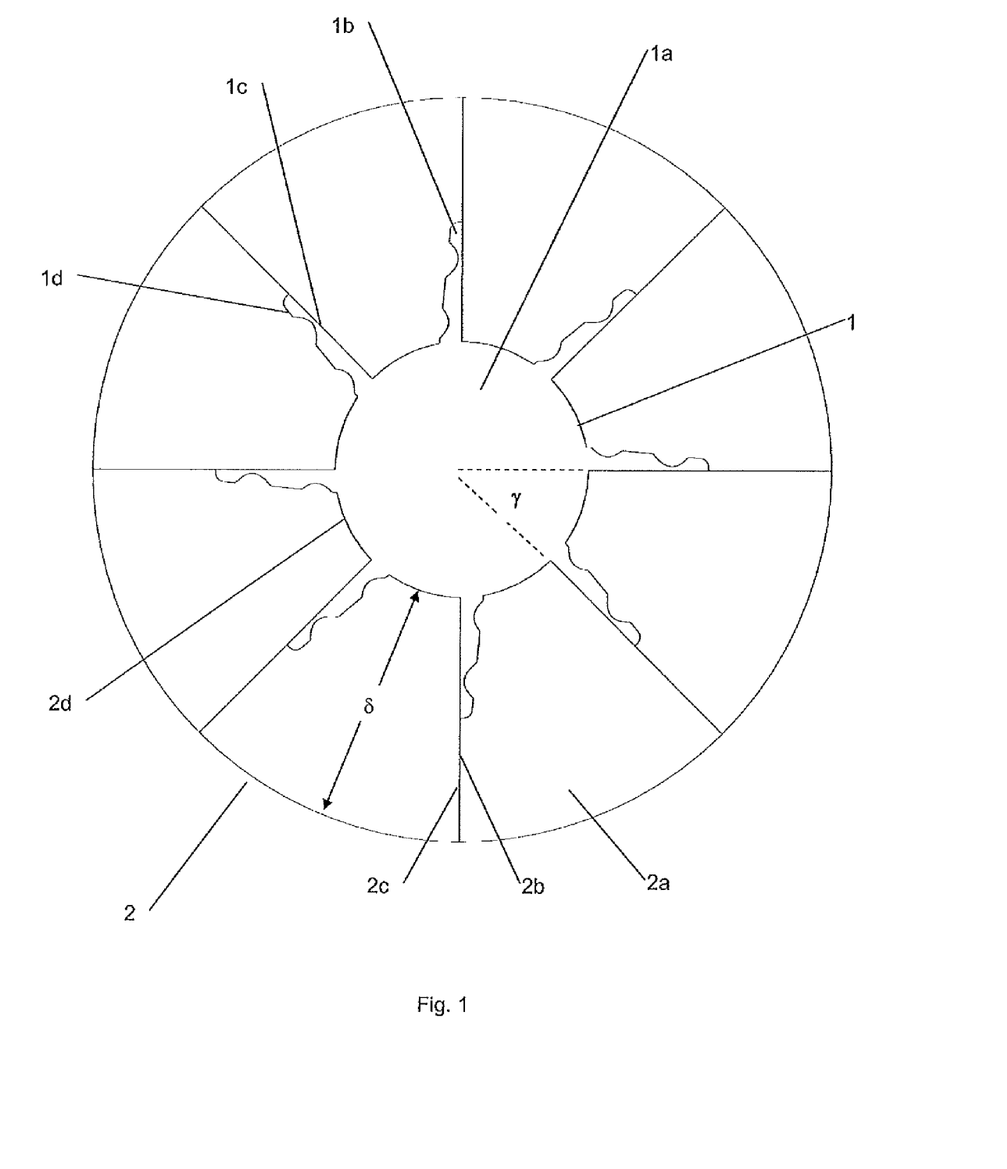
FIG. 1 is a cross sectional view of an eight section mold ready to be filed with molten material.
Figure 2:
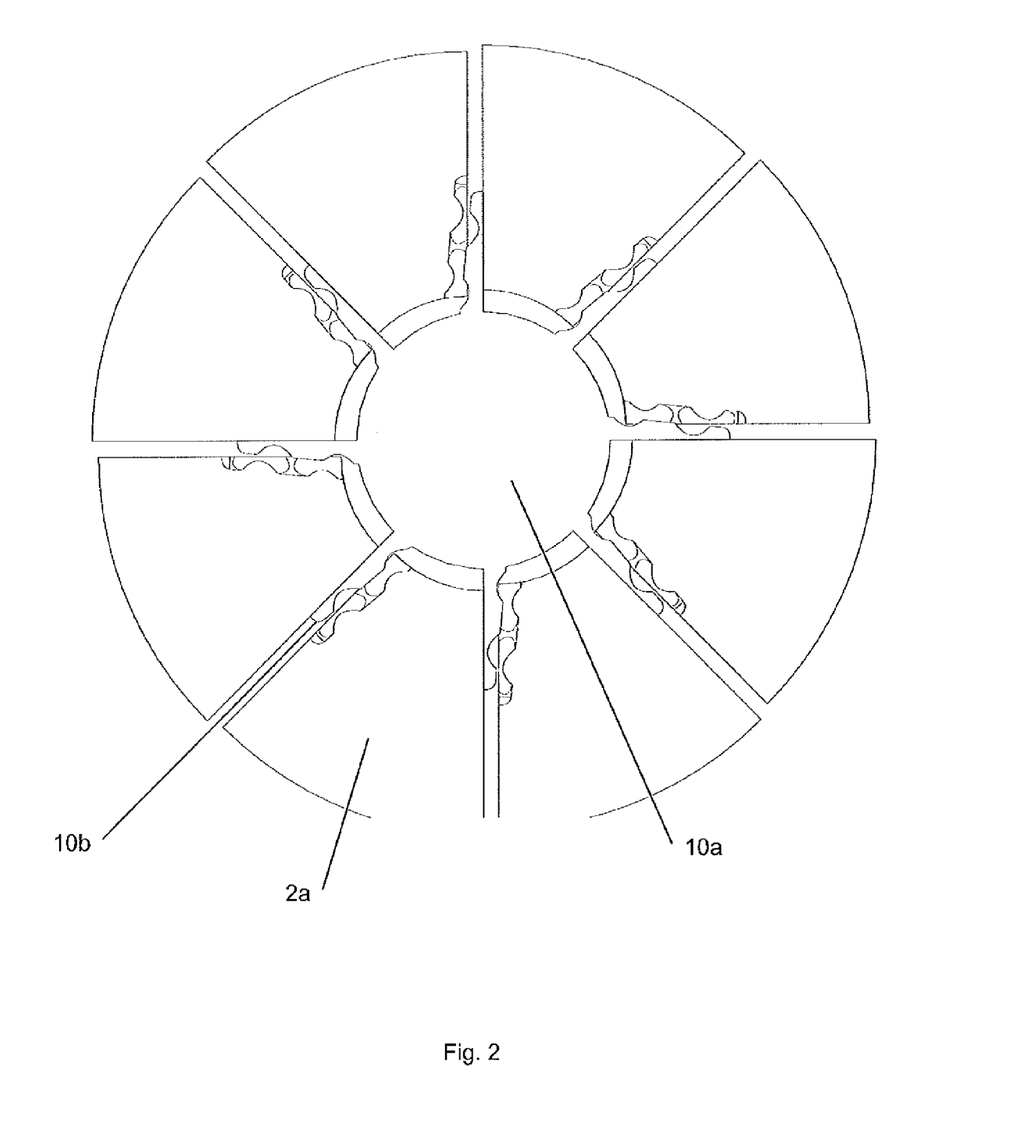
FIG. 2 shows the 8 section mold as it begins to separate to release a newly formed applicator head. Each mold section slides along a flat surface of a bristle.
Figure 3:
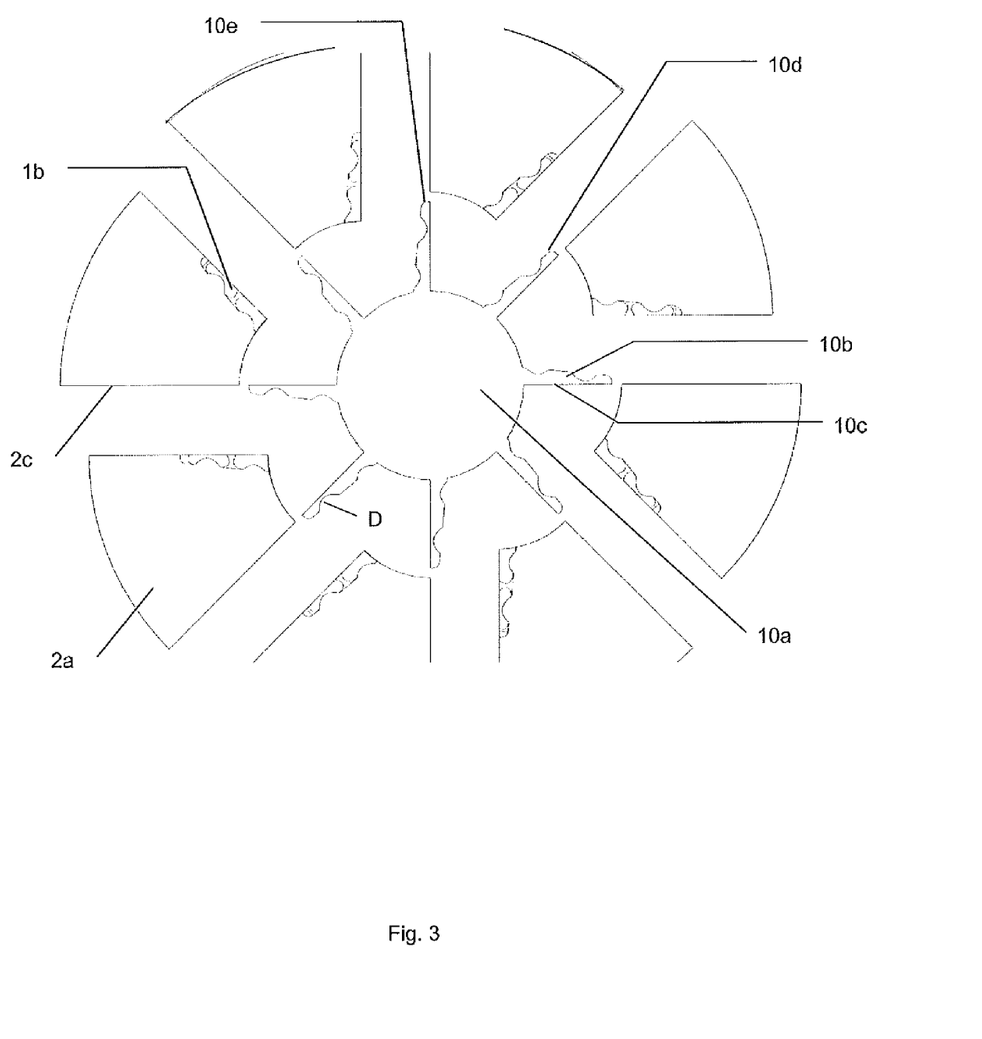
FIG. 3 is a cross sectional view of a newly molded rod with bristles free of the mold.

FIG. 3: Each semi-conical bristle (10b) has two prominent depressions (D) in the rounded surface (10d).

Figure 5:
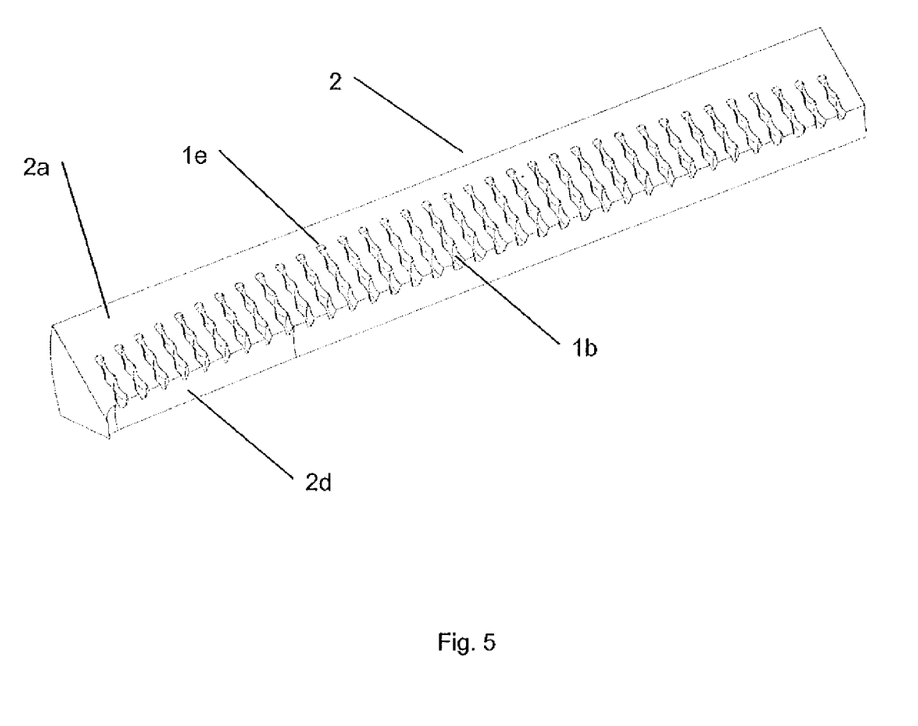
FIG. 5 shows one section of the mold of FIG. 4.

FIGS. 6a-c: The bristles (10b) nearer the ends of the core (10a) have four completely formed prominent depressions (two on a first side of the bristle, and two on a second side of the bristle). Toward the middle of the core, the bristles have six completely formed prominent depressions, three on each side. In between, some bristles have four completely formed prominent depressions and two partially formed depressions, because the height of these bristles was able to accommodate such. A mold section (2a) that might be used to create the applicator head of FIG. 6 is shown in FIG. 5, where it is clear that the bristle spaces (1b) nearer to the middle of the mold section are longer than those nearer the ends.

Figure 7A:
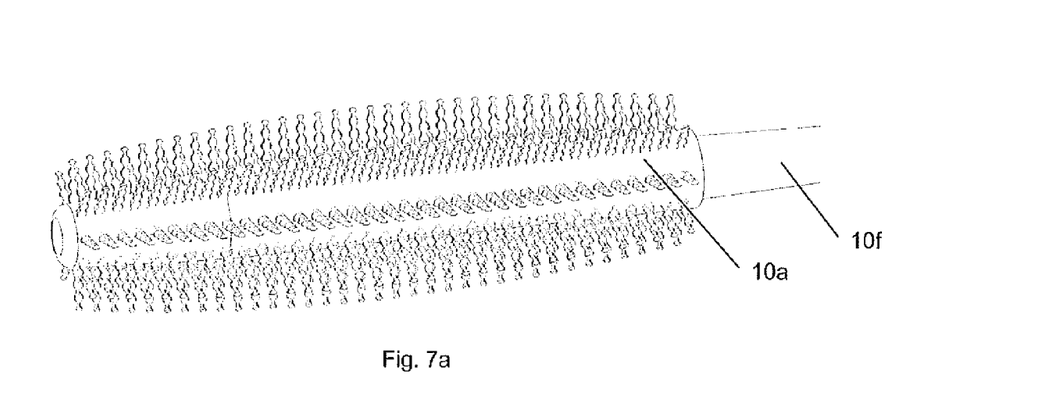
FIG. 7*a* is a perspective view of one embodiment of an applicator head having semi-conical bristles comprising multiple depressions on the rounded surface and no surface features on the flat surface.
Figures 7B, 7C:
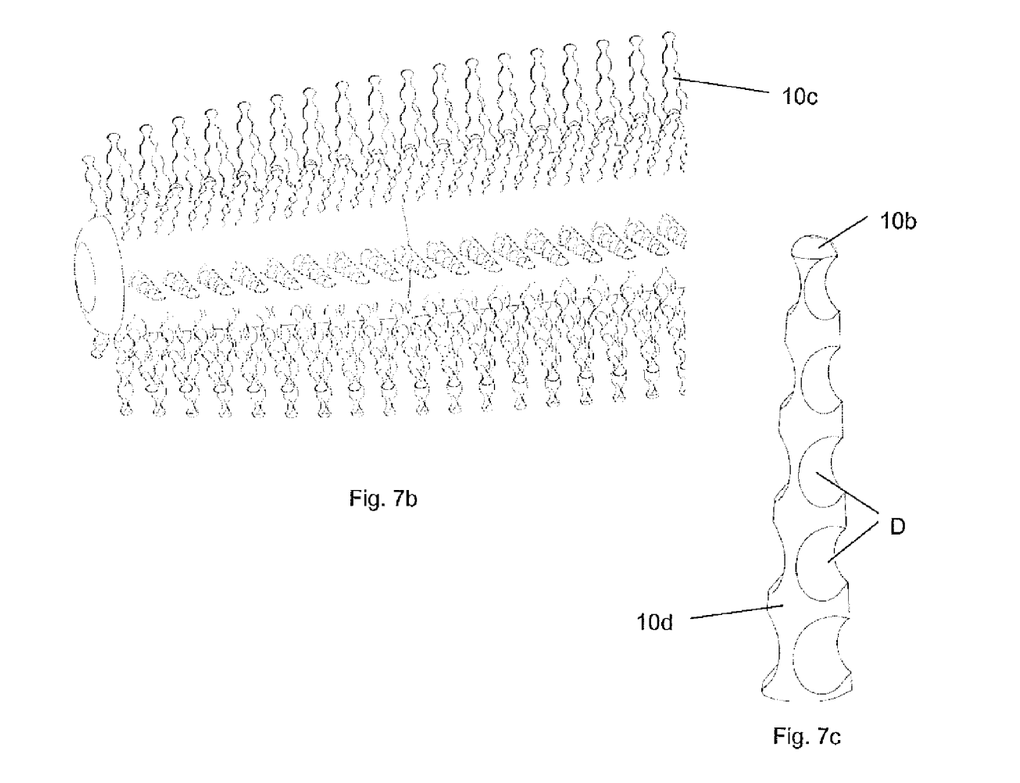
FIG. 7*b* is a close up of a portion thereof.
FIG. 7*c* shows one of the bristles.

FIGS. 7a-7c: The bristles (10b) nearer the ends of the core (10a) have six completely formed depressions (three on a first side of the bristle, and three on a second side of the bristle). Toward the middle of the core, the bristles have ten completely formed depressions, five on each side. In between, some bristles have a mix of completely formed depressions and partially formed depressions.

Figure 8:
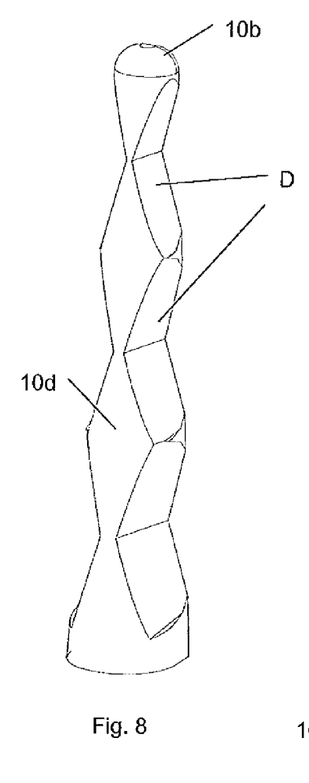
FIG. 8 shows an embodiment of the bristles with multiple flat walled depressions.

FIG. 8: The depressions of the bristles in FIGS. 6 and 7 are rounded. In contrast, a bristle having flat walled depressions (D) on the rounded surface (10d), is shown in FIG. 8. As usual, no surface features are present on the flat surface (10c), which is not visible in FIG. 8.

Bristles with Prominent Protrusions

Figure 9:
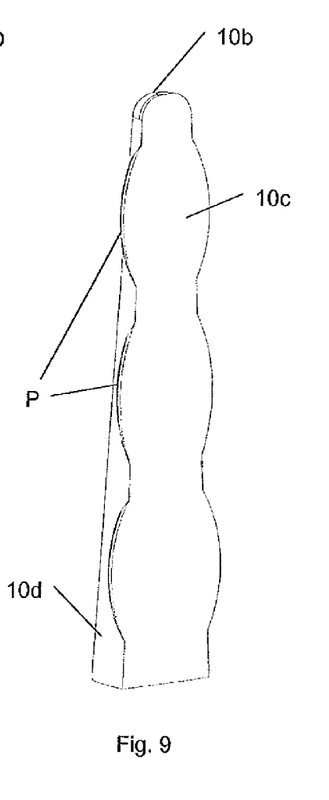
FIGS. 9 and 10 show two different embodiments of semi-conical bristles with multiple protrusions (P).

FIG. 9: Each semi-conical bristle (10b) has six protrusions (P), on the rounded surface (10d), and no surface features on flat surface (10c).

Figure 10:
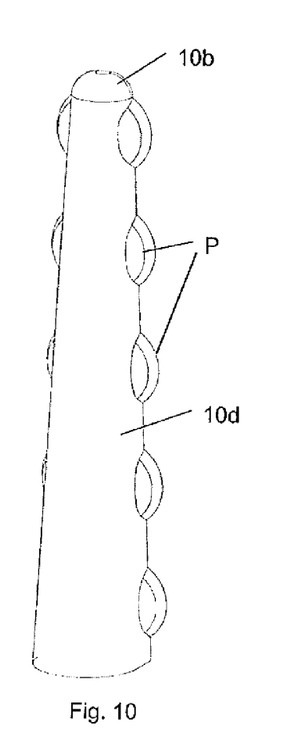

FIG. 10: Each semi-conical bristle (10b) has ten protrusions (P), on the rounded surface (10d) and no surface features on flat surface (10c), which is not visible in FIG. 10.

Bristles with Prominent Protrusions and Prominent Depressions

Figures 11A, 11B:
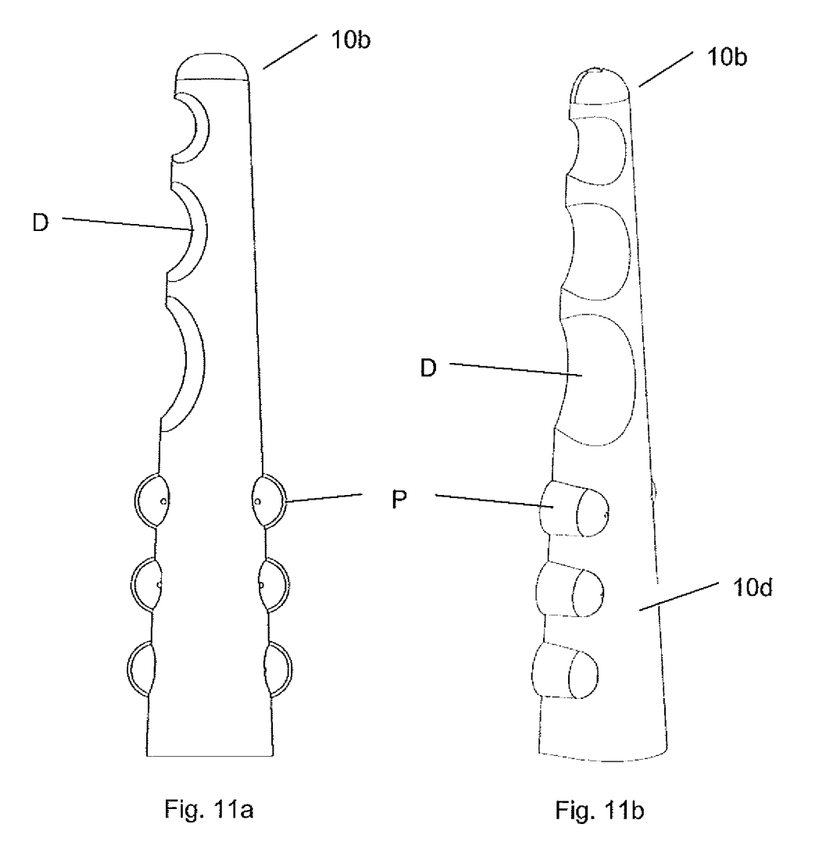
FIGS. 11*a* and 11*b* show one embodiment of the semi-conical bristles with multiple protrusions (P) and multiple depressions (D).

FIGS. 11a and 11b: Each semi-conical bristle (10b) has three depressions (D), and six protrusions (P) on the rounded surface (10d).

Figure 12A:
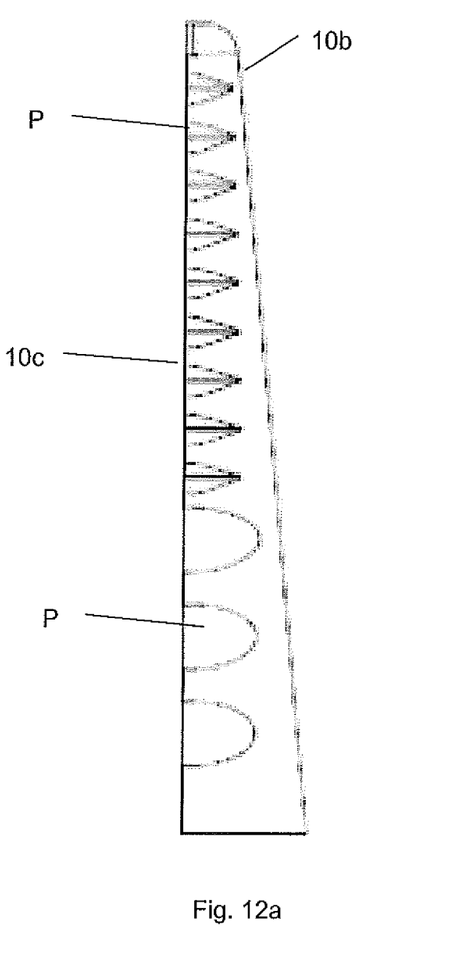
FIGS. 12*a* and 12*b* show another embodiment of the semi-conical bristles with multiple protrusions (P) and multiple depressions (D).
Figure 12B:
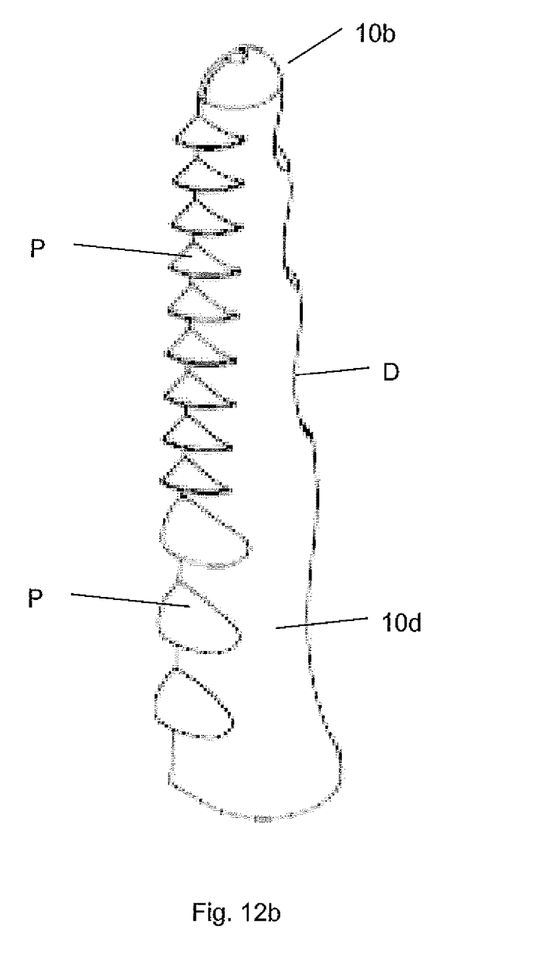
Figure 13A:
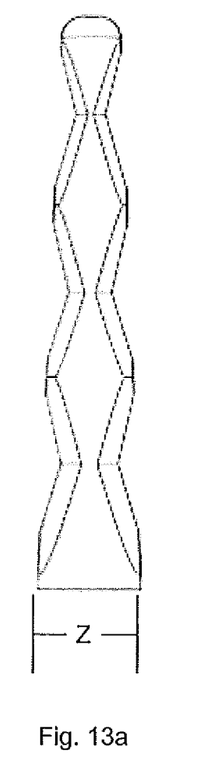
FIG. 13*a-d* show several dimensions of some preferred embodiments of the bristles.
Figure 13B:
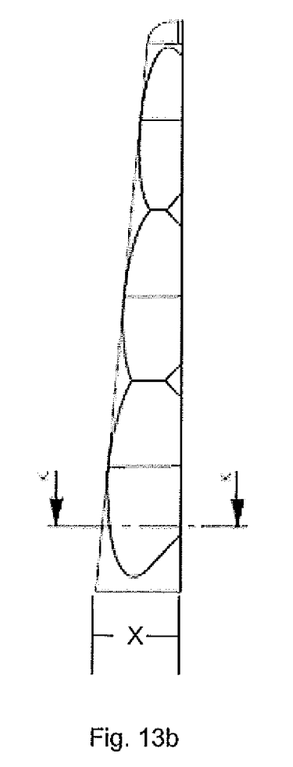
Figure 13C:
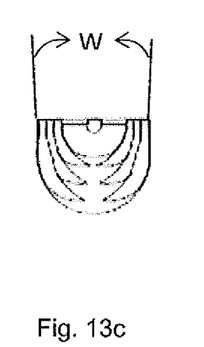
Figure 13D:
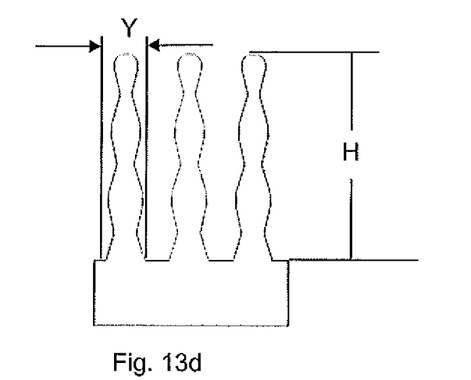

FIGS. 12a and 12b: Each semi-conical bristle (10b) has four depressions (D), nine protrusions (P1) of one type, and three protrusions (P2) of a second type, all on the rounded surface (10d).

In all cases, the protrusions and/or depressions are located on the rounded surface (10d) of an otherwise semi-conical bristle. In every embodiment, the flat surface (10c) is free of any prominent surface features. This is characteristic of the present invention.

Other Embodiments

Figure 14B:
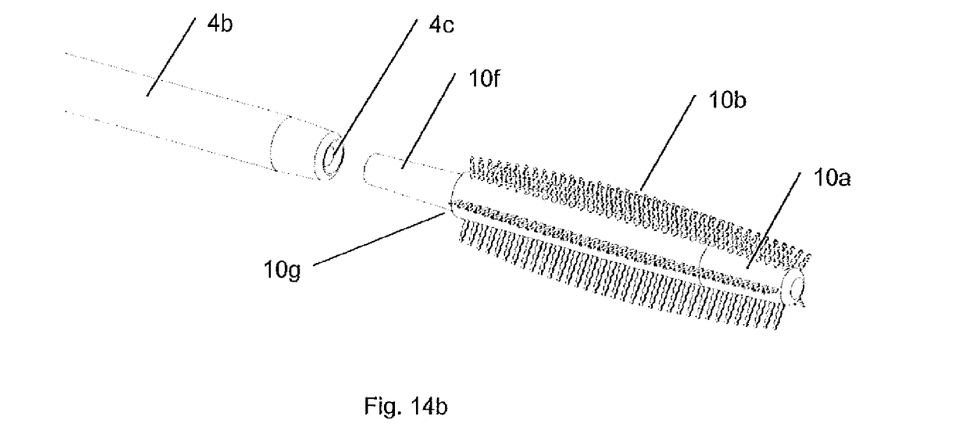
Figure 15:
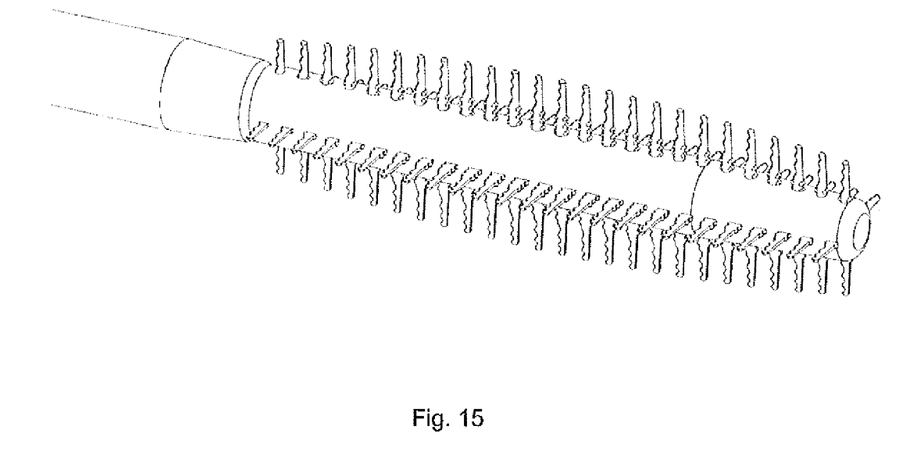
FIG. 15 shows an applicator head with 4 columns of bristles symmetrically arranged.
Figure 16:
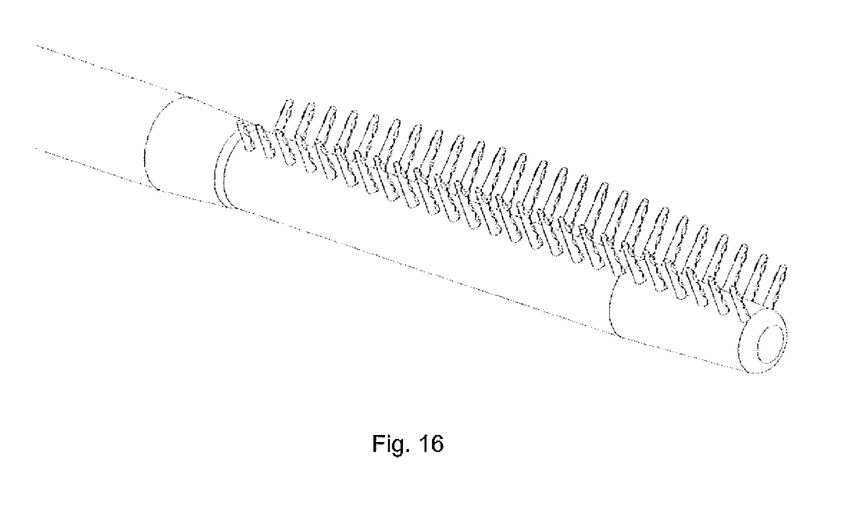
FIG. 16 shows an applicator having two columns of bristles, non-symmetrically arranged.

FIG. 14b shows an applicator head (10) with 5 columns of bristles symmetrically arranged. FIG. 15 shows an applicator head with 4 columns of bristles symmetrically arranged. In general, however, the columns of bristles do not have to be symmetrically arranged. For example, FIG. 16 shows an applicator having two non-symmetrically arranged columns of bristles.

Dimensions

Referring to FIGS. 13a-d, several dimensions of some preferred embodiments of the bristles may be noted. Other dimensions are possible, but the following dimensions are preferred based on bristle performance, and molding and demolding considerations.

Angle W ranges from 0° to about 20°, preferably 5° to 15°, more preferably 5° to 10°. When W=0°, the bristle has an exactly semi-circular cross section. A value of 0<W≤20° means that the cross section is a circular segment having an arc of about 160° to 180°, which may make release from the mold somewhat easier.

Angle X, the base angle of the semi-cone, is about 1° to about 15°, preferably, 2° to 10°, more preferably 3° to 5°.

Y, the width of the base of a bristle, measured across the flat surface (10c) of the bristle, is about 0.1 mm to abut 2 mm, preferably 0.2 mm to 1.5 mm, more preferably 0.3 mm to 0.9 mm.

Angle Z is about 3° to about 12°, preferably 3° to 8°, more preferably 3° to 5°.

H, the height of the bristles will range from about 0.1 mm to about 10 mm, preferably from 0.5 mm to 7 mm, and more preferably from 0.8 mm to 5 mm.

Material

Exemplary materials that can be used in the present invention to mold cosmetic applicator heads include, but are not limited to: silicone elastomers, thermoplastic elastomers (such as, for example, styrene-ethylene-butylene-styrene block copolymer—SEBS), vinyl elastomers (EVA), thermoplastic polyester elastomers (Hytrel® from Dupont de Nemours), thermoplastic polyurethane elastomers (pellethane® from Dow Plastic), Nitrile, and EPDM. Hardness of the chosen material preferably ranges from about 35 MPa (35 shore D Hytrel® from Dupont de Nemours) to about 1180 MPa (82 shore D Hytrel®). More preferably the tensile modulus ranges from about 95 MPa (45 shore D Hytrel®) to about 570 MPa (72 shore D Hytrel®). Most preferably, tensile modulus ranges from about 200 MPa (55 shore D Hytrel®) to about 280 MPa (63 shore D Hytrel®).

Release from the Mold

Applicator heads as described herein, are preferably made by injection molding. When a set of mold sections (2a) are assembled, a mold cavity (1) is defined. Access into the mold cavity is through an opened end of the core space (1a). Molten material may be injected into the mold cavity through the opened end. When a molded applicator head is to be released from the assembled mold (2), the flat faces (2c) of the mold sections (2a) are made to move away from each other radially, and parallel to the flat faces (10c) of the bristles (10b). This is most easily seen in FIGS. 2 and 3. One or more sections of the mold may move simultaneously to release the molded component. Preferably, all sections of the mold move simultaneously to release the molded component, as this would put the least amount of stress on the molded bristles. For example, in a mold with eight sections, the mold sections retreat from each other at 45° increments. For a mold with ten sections, the mold sections retreat from each other at 36° increments, and for a mold with twelve sections, the mold sections retreat from each other at 30° increments, etc. Preferably, the prominent depressions and prominent protrusions have a draft angle that ranges from about 1° to about 25°. This, along with the orientation of the flat and curved surfaces described above, makes it more likely that the sculpted face (2b) of a mold section will pull away from the molded applicator head without subjecting the bristles to any appreciable stress, especially when both of the mold sections that define a bristle separate simultaneously.

What is claimed is:

1. A mold for an injection molded applicator head comprising a number, M, of separable mold sections that when assembled, define a mold cavity, wherein
    each mold section fills an angle of 360°/M;
    each mold section comprises an interior face, a flat lateral face, and a sculpted lateral face;
    the interior faces define a core space that has a longitudinal axis that extends along the length of the core space;
    the sculpted lateral faces are flat except for number of bristle spaces cut into them, such that the bristle spaces extend radially from the core space, and are regularly arranged in M columns that extend down the core space, parallel to the longitudinal axis; and
    the flat lateral faces of adjacent mold sections are oriented to each other at an angle γ=360°/M degrees.

2. The mold according to claim 1 wherein each bristle space comprises base and a tip, and wherein a horizontal cross section of the bristle space is shaped as a circular segment having an arc of about 160° to no more than 180°, and whose radius decreases as you move from base to tip.

3. The mold according to claim 2 comprising from 2 to 12 prominent depressions and/or prominent protrusions located on the rounded surface of at least some of the bristles spaces.

4. The mold of claim 2 wherein each sculpted lateral face has from 5 to 50 bristle spaces.

5. The mold of claim 2 wherein M=2–12.

6. The mold of claim 2 wherein the core space is approximately cylindrical.

7. The mold of claim 2 wherein the core is narrower in the middle than at the ends.

8. The mold of claim 3 wherein the prominent depressions and prominent protrusions have a draft angle that ranges from about 1° to about 25°.

* * * * *